United States Patent [19]

Bradley

[11] 4,367,957

[45] Jan. 11, 1983

[54] TIME-LAPSE INDICATOR OR THE LIKE

[75] Inventor: Robert F. Bradley, New Buffalo, Mich.

[73] Assignee: Micro-Circuits Company, New Buffalo, Mich.

[21] Appl. No.: 100,840

[22] Filed: Dec. 6, 1979

Related U.S. Application Data

[62] Division of Ser. No. 928,788, Jul. 28, 1978, Pat. No. 4,206,838.

[51] Int. Cl.$^{3}$ .......................... G01D 11/00; G07F 1/06; G04F 8/00

[52] U.S. Cl. .......................... 368/114; 368/121; 116/200; 194/4 R

[58] Field of Search .................... 368/3, 9, 62, 89, 101, 368/107, 113-114, 121, 327; 116/114 DM, 200, 204; 338/38, 222, 114, 180; 194/4 R, 4 F, DIG. 23

[56] References Cited

U.S. PATENT DOCUMENTS

| | | | |
|---|---|---|---|
| 2,746,745 | 5/1956 | Damon | 194/4 R |
| 2,917,814 | 12/1959 | Ruckelshaus | 338/143 |
| 3,045,179 | 5/1962 | Maier | 368/114 |
| 3,046,786 | 7/1962 | Tessem | 73/356 |
| 3,205,158 | 9/1965 | Renier | 368/114 |
| 3,273,683 | 9/1966 | Goodman | 194/4 R |
| 3,480,402 | 11/1969 | Jackson | 368/89 |
| 3,520,124 | 7/1970 | Myers | 560/92 |
| 3,679,976 | 7/1972 | Ogawa et al. | 368/114 |
| 3,942,467 | 3/1976 | Witonsky | 368/327 |
| 3,954,011 | 5/1976 | Manske | 73/356 |
| 3,962,920 | 6/1976 | Manske | 368/327 |
| 4,086,475 | 4/1978 | Churchill | 340/51 X |
| 4,100,490 | 7/1978 | Peck et al. | 368/114 |

*Primary Examiner*—Vit W. Miska
*Attorney, Agent, or Firm*—Marmaduke A. Hobbs

[57] ABSTRACT

A time-lapse indicator in which a receptacle contains a fluid material having numerous discrete particles dispersed in a liquid carrier, and a layer of absorbent material in close proximity to the receptacle, the receptacle and absorbent material being separated from one another by a wall which is broken when the time period is to be determined by the indicator. The indicator normally has a pair of electrodes for measuring the resistance of the fluid material after a portion of the liquid carrier has been absorbed therefrom in the absorbent material. Mechanisms for both activating and reading the indicator may be used.

16 Claims, 8 Drawing Figures

Fig. 5
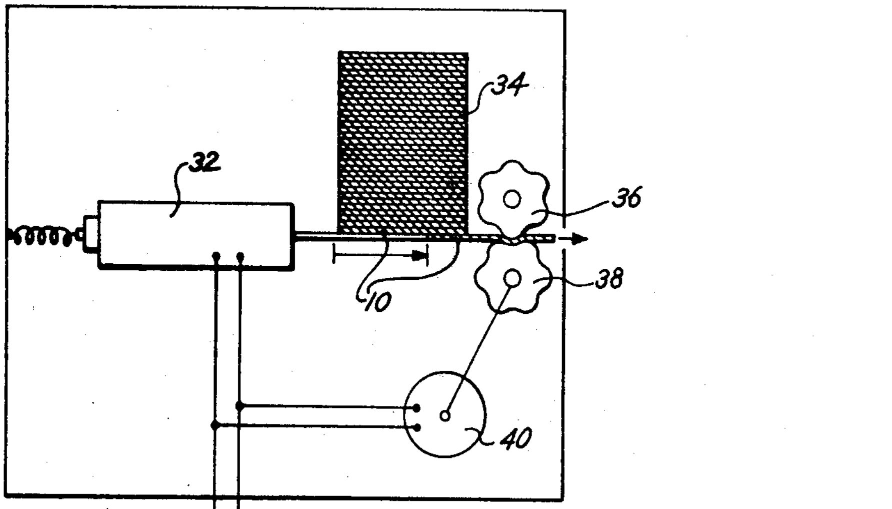
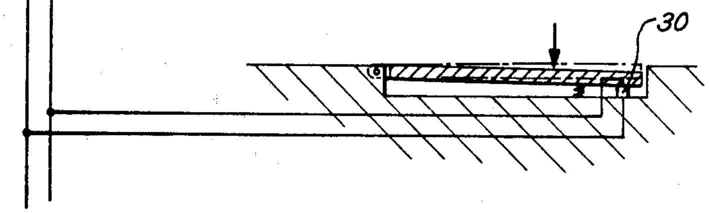
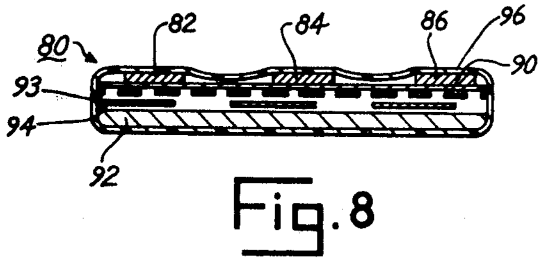
Fig. 8

TIME-LAPSE INDICATOR OR THE LIKE

This application is a division of application Ser. No. 928,788 filed July 28, 1978, now U.S. Pat. No. 4,206,838.

Cards, tickets and the like are extensively used for unattended parking lots at airports, college campuses and in urban areas, and no satisfactory way has been devised which will automatically read the card to determine the time the lot was used by the customer, and indicate the amount due so that the customer can pay as he leaves the lot. Thus, an attendant must be on hand either continually or periodically to check and/or collect the amount due. This same problem or difficulty exists in a variety of different enterprises such as unattended movies, rental of golf carts and other vehicles, tool roads, and amusement and recreational facilities. In the use of these enterprises and facilities, most people are honest and are willing to pay the correct amount on the basis of time used; however, there has not in the past been a satisfactory way for the user to be adequately apprised of the amount due without the presence of an attendant to determine and collect the amount due. It is therefore one of the principal objects of the present invention to provide a card, ticket or device which can be taken by a customer as he enters a parking lot or other establishment, and which automatically changes in a manner which permits a machine or system to read the card, ticket or device to sense the time the lot or other facility has been in use and to indicate to the customer the amount due so that the customer can deposit the amount on leaving.

Another object of the invention is to provide a time-lapse card or the like which can be activated at a given time and under preselected conditions to, in effect, record the time thereafter until the card is read by a machine or system to indicate the lapsed time and convert the time into readable information.

In addition to the use of the card for parking lots and other establishments and facilities mentioned above, the card, envelope, label or similar device can be used to indicate the condition of perishable commodities, such as milk, meat, eggs, orange juice and medicines and many other products and things. In connection with these additional uses, it is an object of the invention to provide an indicator which is responsive to time and/or temperature, so that various sensed conditions of the products will be accurately reflected by the indicator when read or tested in practice.

Still another object of the invention is to provide a relatively simple time-lapse card or similar device which can easily be dispensed, carried and read, and which can be so constructed and designed that it can be used to sense only a short period of time, or long periods of time, or both, so that it can be used to indicate time-lapse of less than an hour or several weeks or longer, thus being readily adaptable to different types of rental or parking periods.

A further object is to provide a system and method which utilize a card, device or indicator of the aforementioned type, and which can be readily adapted to the various uses and applications discussed herein, and to provide apparatus for dispensing the cards and for reading the cards and reporting the results after the cards have been used.

Additional objects and advantages of the present invention will become apparent from the following description and accompanying drawings, wherein:

FIG. 5 is a schematic view of a machine for dispensing and activating a card or ticket of the type shown in the preceding figures;

FIG. 8 is a vertical cross sectional view of a card or ticket illustrating a modified form of the present invention.

Figure 1:
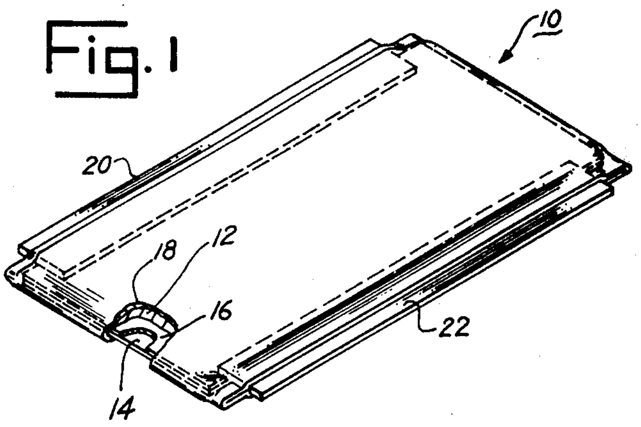
FIG. 1 is a perspective view of a card or ticket embodying the present invention.
Figure 2:
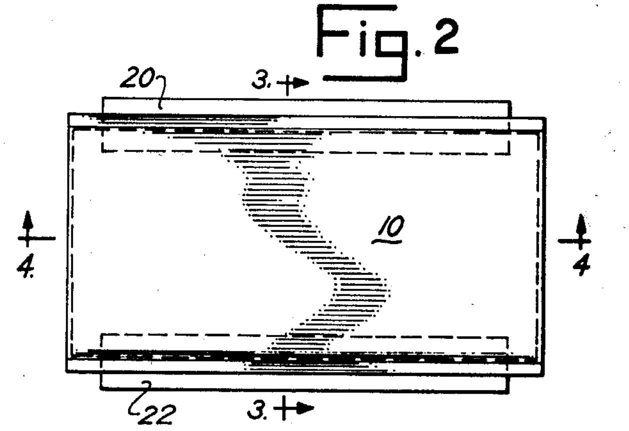
FIG. 2 is a top plan view of the card or ticket shown in FIG. 1.
Figure 3:
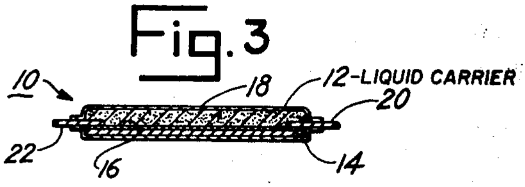
FIG. 3 is a vertical cross sectional view of the card shown in the preceding figures, illustrating in greater detail the various components used in the construction of the embodiment shown, the section being taken on line 3—3 of FIG. 2.
Figure 4:
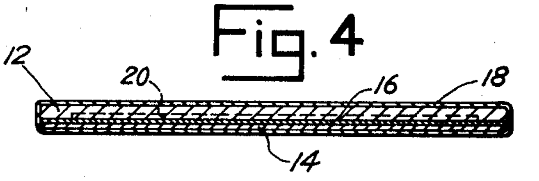
FIG. 4 is a vertical cross sectional view taken on line 4—4 of FIG. 2.

The present invention relates to a time-lapse indicator in which a receptacle contains a fluid material having numerous discrete particles dispersed in a liquid carrier and a layer of absorbent material in close proximity to the receptacle. The receptacle and absorbent material are separated from one another by a frangible wall, which is broken when the time period is to be determined by the indicator is started. The indicator may have a pair of electrodes in contact with the carrier for measuring the resistance of the fluid material after the portion of the liquid carrier has been absorbed therefrom in the absorbent material and thereby determining the time lapsed since the indicator was activated. Various other means may be used to read the indicator to determine the period of time since activation of the indicator.

One embodiment of the present invention involves the use of a fluid material having conductive discrete particles, or pigment, such as graphite, carbon black or metal powder, dispersed in an insulating carrier, such as a flowable resin binder or a liquid, preferably forming a paste, wherein the resistance of the mixture is increased above the resistance of the pigment alone due to the separation of the pigment particles by the insulating binder or liquid. The amount of increase in resistance is adjustable through a very wide range by using different amounts of insulating carrier, different kinds of pigment, different kinds of carrier and additives. However, for a given set of ingredients, varying the ratios between them yields predictable variations in resistance. For example, with a particular set of ingredients the resistance per a given square varies smoothly from $3\times10^8$ ohms at a ratio of one part by volume of a carbon mixture to six parts carrier down to a resistance of $10^3$ ohms at a ratio of one part by volume of conductive mixture to two parts by volume of carrier. The resistance is decreased by the use of an absorbent layer which removes a portion of the carrier, resulting in concentration of the particles. The absorbent surface of the absorbent card may be separated from paste by a thin, brittle, frangible barrier through which the fluid must pass after it is broken. As the card or ticket is dispensed to the driver, it may be rolled through a set of rollers of sufficiently small diameter to crush the brittle barrier so that the liquid portion of the fluid may begin to migrate into the porous layer, so that resistance of the liquid material will begin to drop and, in dropping, measure the passage of time until the driver leaves the parking area, for example. As an alternative, the paste may be in a pouch at one end or side of the absorbent layer, and, when the pouch is broken, the paste flows or is otherwise spread onto the absorbent layer. In this embodiment, as in the other, a rupturable wall portion breaks to permit the paste to reach the absorbent layer, the wall of the pouch which breaks being the rupturable wall portion in this embodiment and the frangible layer being said wall portion in the other embodiment.

When the driver drives up to the exit gate, he inserts the card or ticket into a reader-computer, which need be only a little more complex than a pocket calculator, except for its necessary mechanical functions of positioning the ticket and denying exit until payment has been made. This reader-computer measures the resistance of the liquid material to determine what elapsed time the resistance represents, and displays the amount of money which the driver must toss into a hopper to cause the exit gate to rise so that he can leave. When the card or ticket is first dispensed it can, if desired, be stamped numerically with the date and time so that, in case of equipment malfunction or disagreement, the driver can prove his actual time in the parking lot.

Cards with widely varying maximum times, from minutes to months, can be constructed by varying the construction. For example, the liquid can be more or less viscous, the porosity of the absorbent can be varied, an extra perforated sheet can be placed over the porous surface to reduce the contact area, thicker or thinner films of fluid can be used, or discrete particles or pigments of different conductivity can be used. Cards of different time ranges may be color coded and also notched, to permit the reader to select the proper time range. A driver entering the lot for less than a day may press a button to select a one-day card, or a driver expecting to leave his car for several days, for example at an airport, may select a one-week card. To reduce the effect of temperature, a wide range of means is available to reduce variations in viscosity. These include the viscosity index improvers used in motor oils and silicone liquids. In addition, the reader may be programmed to introduce a temperature correction factor from season to season or day to day if the driver is required to leave the card in the car.

FIGS. 1 through 4 illustrate generally the principle of operation, as applied to a card 10 in which a high resistance, flowable mixture of discrete particles or pigment and liquid carrier 12 is applied to a porous surface of the absorbent layer such as layer 14, when the indicator is activated. In one embodiment, the carrier is initially separated from the surface by a frangible layer or wall 16, which together with cover or wrapper 18 forms a pouch for the liquid material, i.e. the carrier with the discrete particles dispersed therein. The high resistance at the time of spreading will be taken as the resistance at zero time. By capillary action, the porous absorbent layer 14 will begin to absorb the liquid carrier at a rate controlled by the porosity of the absorbent, viscosity of the carrier, and area of liquid in contact with the porous absorbent layer. The conductive pigment particles selected are intentionally too large to migrate into the card. As a result, the pigment layer on the surface of the card will become more and more conductive as time passes, in that the particles in the layer move closer together as the liquid carrier migrates therefrom into the absorbent layer.

In the embodiment illustrated in FIGS. 1 through 4, two opposite edges of the card are provided with spaced means to sense the lapse of time including electrically conductive contact surfaces or electrodes 20 and 22, preferably printed from conductive ink, with the electrodes in contact with the liquid material containing the discrete particles. When the ticket or other card is activated, the resistance of the above semi-conductive mixture bridging the gap between the conductive surfaces drops as a function of time, thus permitting the resistance of the mixture to be measured at any time. Any measured resistance translates into a predetermined length of time corresponding to the change in resistance.

In the use of the ticket for an unattended parking garage, as a driver drives in he receives a ticket dispensed by a machine. In dispensing the card the machine may roll it between two rollers which will break the frangible layer 16 and spread the semi-conductive fluid across the surface of the absorbent card between the two electrodes. The absorbent layer is one layer of the sandwich structure, the frangible layer and the fluid being two intermediate layers, and the impervious, flexible cover which prevents escape of the fluid and assists in smearing of the fluid on the absorbent layer being the fourth layer.

Figure 6:
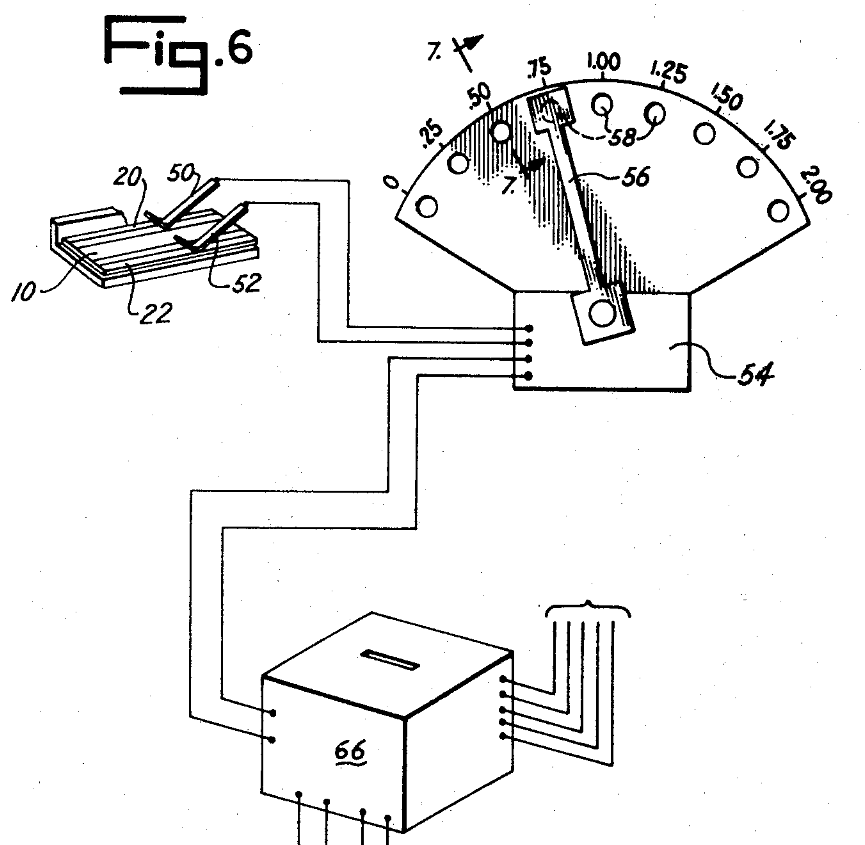
FIGS. 6 and 7 are schematic views of a machine for reading the card or ticket dispensed and activated by the machine illustrated in FIG. 5.
Figure 6:
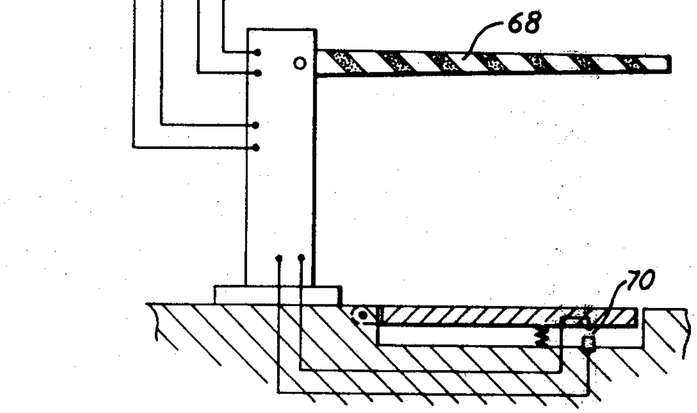
Figure 7:
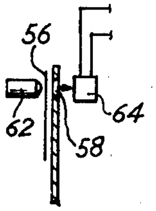

Equipment suitable for dispensing the timing cards and for reading the indicator is shown in FIGS. 5, 6 and 7. This equipment makes use of known and commercially available components, and hence detailed circuitry and mechanical constructions are not shown. Each use may require different equipment, the one shown applying to a parking garage. A dispenser holds a roll or stack of cards and dispenses them as needed, and the timing function is started by a mechanism which crushes the frangible layer 16 or spreads out permitting absorption of the conductive mixture by layer 14. The frangible layer may also be broken by mechanical vibration or by melting the barrier from exterior heat, heat supplied by a printed heating element in the card, or by other kinds of radiation which will break down the barrier.

In the illustrations of the equipment shown in FIG. 5, a switch 30 is operated by one of the wheels of an automobile approaching the dispenser. The switch actuates a solenoid 32 which pushes the end of one card from stack 34 between the loosely fitted teeth of two gears or rollers 36 and 38, which are driven by a motor 40 also controlled by switch 30. Suitable bending of the card between the gear teeth crumbles the brittle barrier between the conductive paste and the absorbent layer or other porous medium which absorbs the liquid from the paste to lower the resistance of the liquid material of discrete particles and carrier, thus starting the timing period. The driver of the auto takes the activated card and drives in to park. It is possible to have three or more separate timing areas on the card, one for timing up to one day, one for up to one week, and one for up to one month.

FIG. 6 shows a card reader, parking fee calculator, and gate control to release the automobile after the driver has placed the proper amount of money in a hopper or other coin receiving device. The driver slips the card into the reader mechanism, and two ohmmeter contacts or probes 50 and 52, which contact the exposed terminals of the card, permit the conventional ohmmeter 54 to measure the resistance of the liquid material in the card at the time of leaving the parking lot. This resistance correlates with the elapsed time and corresponding parking fee, which may be printed around the dial of the ohmmeter as shown, the hand or needle 56 of the ohmmeter pointing to the parking fee required. The hand also covers one of the holes 58 in the dial of the ohmmeter, and on one side of each hole is a light 62 and on the other side is a photocell 64. When the hand covers a hole, it deactivates the corresponding photocell and activates the appropriate circuitry in the coin counter 66. The deactivated photocell, through wiring shown, signals the coin counter how many coins must be tossed in before it opens gate 68. Switch 70 operated by the automobile in leaving returns all functions to starting position in preparation for the next card to be inserted and processed.

The modified form of the invention shown in FIG. 8 measures the passage of time in much the same manner as the embodiment previously described herein and produces a condition which can be sensed by a magnetic field created by the reading equipment. In the first embodiment of the invention described herein, the electrodes extend from two opposite sides of the paste area. Those electrodes permitted the change in resistance of the paste, as the carrier liquid leaves it, to be measured directly by electrical contact with the electrodes. In the magnetic embodiment, no exterior electrodes are required. Since there is circuitry available to read changes in magnetic and conductive surfaces, such as tape recorders and bank check readers, this type may be more acceptable or adaptable commercially than timers read by contact.

The indicator consists of a card 80 having five operating layers plus a thin plastic protective cover on both sides, similar to the previously described embodiment, but having separate timing areas indicated as 82, 84 and 86, area 82 representing the minimum time measured, such as one minute, or one hour or one day, area 84 representing a timing range ten times as long, and area 86 representing a range 100 times as long. A timing card to be read electromagnetically generally has the same physical construction as one read magnetically, but the pigment in the paste layer in the former would be conductive, such as silver or graphite.

The magnetic particles suspended in liquid, forming a paste, are disposed in areas 82, 84 and 86, and a frangible layer 90 separates the paste from an absorbent layer 92 which, when the frangible layer is broken, absorbs the liquid carrier for the magnetic pigment. In order to facilitate good distribution and uniform timing, dispersion layer 93 and a control layer 94 are disposed between the frangible layer and absorbent 92. All five layers are encapsulated in a flexible, impervious plastic wrapper 96. When the ticket or card is to be used, the frangible layer is broken, in a manner such as described with reference to the card of the first embodiment, and after the selected period of time has expired, the ticket is read by the use of a magnetic sensor, which provides a signal commensurate with the degree of absorption of the liquid from the paste, thus accurately indicating the elapsed time.

In the equipment for sensing the passage of time with a magnetically readable card, there is a magnetic core in the reader head, the air gap of which rests on the magnetic paste of area 82, for example, and which has a coil of insulated wire which magnetizes the core as a result of an alternating current from a source having a steadly frequency and voltage. Because of the air gap in the core, the alternating magnetic field in the core is small when the magnetic permeability of the paste is low, and increases as the permeability increases. The coil is in series with one side of a center-tapped coil of a differential transformer, and a coil with the same impedance as the first coil is in parallel therewith across the source and is in series with the winding of the differential transformer.

In the operation of this embodiment, a timer card is inserted in the time-measuring circuit so that one of the magnetic areas 82, 84 or 86 bridges the air gap in the magnetic core. In a timer in which the liquid carrier mixed with the magnetic pigment has not started to migrate into the porous layer 92, the magnetic particles are held apart by the carrier, and the magnetic permeability is low. Under this condition, the coils, by design, will have equal impedance, which is a measure of their resistance of the flow of alternating current from the source. Since their impedances are equal under this condition, they allow two equal currents to flow in opposite directions in the primary windings of the differential transformer. Because the currents are equal and opposite, they produce no magnetic field in the core of that transformer and no voltage is induced in the secondary winding. Thus no signal voltage is applied to the base of the NPN class B transistor amplifier. As the carrier leaves the paste, the permeability rises, thus permitting an increase in magnetic flux in the core and a related increase in impedance in the first coil so that the alternating current therein and in the transformer primary winding becomes smaller, while the current in the reference windings remain constant. With the currents in the two opposite windings of the differential transformer different, a voltage is induced in output or secondary winding which acts as a signal to be amplified. The signal to the amplifier and its amplified output to the microprocessor will increase in proportion to elapsed time, in that the permeability of the paste area on the card is increasing with time. Thus, at any time after the timing cycle of area 82, for example, has been started, the timer may be placed under the sensing core air gap, and an amplified signal proportional to that time will be applied to the micro-processor. Since all of the electrical and mechanical elements required to build a timer-controlled parking lot, selected only for illustration, are already in use in other applications, they are not shown herein.

In other modifications and embodiments of the present invention, the lapse of time may be indicated by a change in the color, for example, of the paste or other liquid material containing the discrete particles, such as pigment, subjected to the absorbent material which, as explained herein, removes the liquid carrier at a predetermined rate of time. The concept of the visual reading of the card can be combined with the electrical or magnetic reading set forth herein or it may be used separately for cards or tickets or labels on containers having perishable products therein. The absorption of the carrier from the liquid material in which the discrete particles are disposed may also result in a change in measurable reflection or passage of light, or a change in the odor or stickiness of the surface of the card, label or other device in which the concept is embodied. Other means of reading the change in the liquid material resulting from the separation of the particles from the carrier by the absorption of the carrier in an absorptive material can be used in practicing the present invention.

While only two embodiments and a number of variations have been described herein, various changes and modifications may be made without departing from the scope of the invention.

I claim:

1. A mechanism for activating a time-lapse indicator utilizing electrical or magnetic characteristics and having a layer containing fluid material with numerous discrete particles and a layer of absorbent material in close proximity to said first layer, separated therefrom by a frangible layer: said activating mechanism including a means for flexing said frangible layer to cause said layer to break into numerous pieces, thereby releasing the liquid in said fluid material to be absorbed by said absorbent material and thereby changing said characteristics of one of said layers, and means for feeding the indicator to said flexing means when the operation of the indicator is to be initiated.

2. A mechanism for activating a time-lapse indicator as defined in claim 1 in which said means for flexing said frangible layer consists of a pair of rollers having longitudinal ribs and grooves between which said time-lapse indicator is passed.

3. A mechanism for reading a time-lapse indicator utilizing electrical or magnetic characteristics and having a fluid material containing a solid component of discrete particles and a fluid component and an absorbent material for absorbing said fluid component: said mechanism comprising a sensing means for determining the resistance of said fluid material after a portion of said fluid component has been absorbed by said absorbent material, and means indicating the resistance of said fluid material and thereby the length of time said fluid component has been absorbed by said absorbent material.

4. A mechanism for reading a time-lapse indicator as defined in claim 3 in which said last mentioned means includes a means responsive to the resistance of said fluid material for indicating the amount and length of time the liquid carrier has been absorbed by said absorbent material.

5. A method of using a time-lapse indicator utilizing electrical or magnetic characteristics and having a layer of absorbent material and a layer of liquid, said layer of liquid having numerous discrete solid particles, a rutuable wall seperating seperating said layers, the steps comprising rupturing said wall to bring together said layer of absorbent material and said liquid to activate said liquid layer to progressively change the concentration of said particles therein and thereby to change said characteristics of the indicator as the duration of time increases, permitting a period of time to lapse after activation, and utilizing said change in said characteristics to determine the lapse of time after activation of said one layer.

6. A method of using a time-lapse indicator as defined in claim 5 in which said layer of liquid contains electrical conducting particles, and liquid is absorbed from said liquid layer by said layer of absorbent material, whereby said liquid layer becomes less resistant to an electrical current.

7. A method of using a time-lapse indicator as defined in claim 5 in which said layer of liquid contains magnetically permeable particles, and liquid is absorbed from said liquid layer by said layer of absorbent material, whereby said liquid layer becomes more permeable to a magnetic field.

8. The method as defined in claim 6 which includes the further step of determining the magnetic permeability of said liquid containing said solid particles.

9. A method of using a time-lapse indicator as defined in claim 5 in which said activated layer becomes more conductive to an electrical current, and in which said method includes a further step of passing a current through said activated layer to produce a signal indicating the lapse of time after activation.

10. A method of using a time-lapse indicator as defined in claim 6 in which an electric current is passed through said liquid and the degree of change in the resistance is measured for determining the lapse of time after activation.

11. A method of using a time-lapse indicator as defined in claim 10 in which said method includes a further step of utilizing said change in resistance to activate a timer for determining the lapse of time after said fluid has been introduced into said absorbent layer.

12. In a method of using a time-lapse indicator having a layer of absorbent material, a layer of liquid material, a rupturable wall separating said layers, and numerous electrically conductive discrete solid particles in one of said layers: the steps comprising rupturing said wall to introduce said fluid into said absorbent layer for varying the concentration of said solid particles in said one layer, permitting a period of time to lapse after introducing said fluid into said absorbent layer, and sensing the lapse of time by determining the change in conductivity of said conductive particles produced by the flow of said liquid into said absorbent material after said fluid has been introduced into said absorbent layer.

13. The method defined in claim 12 in which said solid particles are disposed in said liquid and the method includes the further step of determining the resistance of said particle containing liquid.

14. A method defined in claim 12 in which said solid particles are disposed in said liquid and the method includes the further step of determining the degree of concentration of said particles in said liquid.

15. A method defined in claim 12 in which said solid particles are disposed in said liquid and the method includes the further step of determining the conductivity of said liquid containing said solid particles.

16. The method as defined in claim 15 in which said solid particles are disposed in said liquid and said further step includes determining the electrical conductivity of said particle containing liquid.

* * * * *